(12) United States Patent
Rowley

(10) Patent No.: US 7,676,457 B2
(45) Date of Patent: Mar. 9, 2010

(54) AUTOMATIC INDEX BASED QUERY OPTIMIZATION

(75) Inventor: Peter A. Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 220 days.

(21) Appl. No.: 11/606,861

(22) Filed: Nov. 29, 2006

(65) Prior Publication Data

US 2008/0126297 A1    May 29, 2008

(51) Int. Cl.
*G06F 7/00*    (2006.01)
(52) U.S. Cl. .......................................... 707/3; 709/224
(58) Field of Classification Search .................. 707/1–8; 709/224

See application file for complete search history.

(56) References Cited

U.S. PATENT DOCUMENTS

| 5,854,938 | A  | * | 12/1998 | Ogi ............................. 712/30 |
| 6,266,658 | B1 |   | 7/2001  | Adya et al. |
| 7,188,094 | B2 |   | 3/2007  | Excoffier et al. |
| 2006/0200556 | A1 | * | 9/2006  | Brave et al. ................. 709/224 |
| 2006/0265377 | A1 | * | 11/2006 | Raman et al. .................. 707/9 |
| 2007/0192293 | A1 | * | 8/2007  | Swen ............................ 707/3 |
| 2007/0294272 | A1 |   | 12/2007 | Anderson et al. |

* cited by examiner

*Primary Examiner*—Wilson Lee
(74) *Attorney, Agent, or Firm*—Blakely, Sokoloff, Taylor & Zafman LLP

(57) ABSTRACT

A method and apparatus for automatic index query optimization for a Lightweight directory Access Protocol (LDAP) system. Embodiments include a method for receiving a query for an LDAP repository. The method may further include reorganizing search terms in the query based on a uniqueness value of corresponding LDAP indexes to generate a modified query, and executing the modified query.

15 Claims, 5 Drawing Sheets

AUTOMATIC INDEX BASED QUERY OPTIMIZATION

TECHNICAL FIELD

Embodiments of the present invention relate to optimization of indexing in a Lightweight Directory Access Protocol (LDAP) server. Specifically, the embodiments relate to optimizing received search filters for improved efficiency in evaluation.

BACKGROUND

The Light Weight Directory Access Protocol (LDAP) has become very popular due to its efficient and fast data access. A large number of applications/services are currently in use and being developed which utilize an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes and each entry has an objectClass attribute containing named classes defined in the schema. The objectClass attribute may be multivalued and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes) and the obligation of containing another set of attributes (mandatory or required attributes). For example, an entry representing a person might belong to the class "person" Membership in the "person" class would require the entry to contain the "sn" and "cn" attributes and allow the entry also to contain "userPassword," "telephoneNumber," and other attributes.

An LDAP directory server may access specific data items in the LDAP directory in response to a client request. The LDAP server retrieves attributes and entries from the LDAP directory that is stored in the LDAP repository. The attributes and entries may be requested by a query including a filter. The search terms in the filter are evaluated in the order specified by the user. Some search terms return a large set of values and operating on this large set of values degrades system performance by occupying a large amount of system memory.

BRIEF DESCRIPTION OF THE DRAWINGS

The present invention is illustrated by way of example, and not by way of limitation, in the figures of the accompanying drawings.

DETAILED DESCRIPTION

Figure 1:
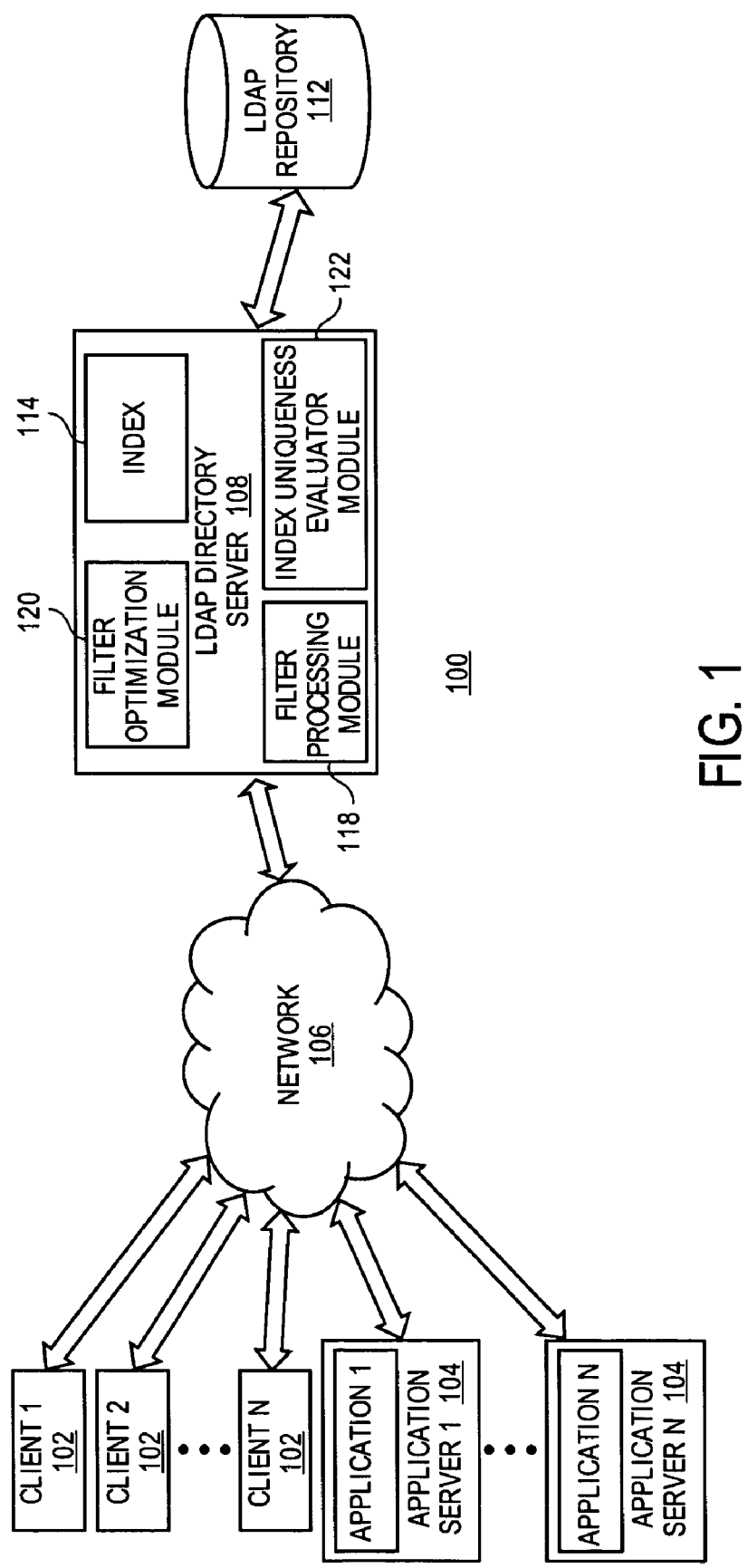
FIG. 1 is a diagram of one embodiment of a network and system including a lightweight directory access protocol (LDAP) server.

Described herein is a method and apparatus for optimizing the evaluation of received search filters at a Lightweight Directory Access Protocol (LDAP) server. Each received filter is analyzed and reorganized based on the uniqueness of each search term. The filters may also be canonicalized so that they are primarily organized as conjunctions to allow for a narrowing processing of candidate lists. Uniqueness values may be calculated and maintained for each index and may also be calculated and maintained for non-indexed search terms to support the filter optimization.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media; optical storage media, flash memory devices or other type of machine-accessible storage media.

FIG. 1 is a diagram of one embodiment of a network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs) or similar devices capable of communicating over the network 106 and running an LDAP client.

The clients 102 are coupled to the LDAP directory server 108 via the network 106, which may be a public network (e.g., Internet) or a private network (e.g., a virtual local area network (VLAN)). The LDAP directory server 108 may contain a server front-end responsible for network communications, plugins or modules for server functions (such as access control and replication), a basic directory tree containing server-related data and a database back-end plugin responsible for managing the storage and retrieval of LDAP repository data.

In one embodiment, the clients 102 communicate with the LDAP directory server 108 via a web server (not shown). For example, the clients 102 may execute web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that host various applications requesting information from the LDAP directory server 108. The application servers 104 operate as clients in communications with the LDAP directory server 108. Similar to the clients 102, the application servers 104 may communicate with the LDAP directory server 108 directly or via a web server.

The LDAP repository 112 may be part of the LDAP directory server 108 or it may reside externally (e.g., on a database server). The LDAP repository 112 may contain a tree of data entries. The structure of the entries may be specified in the definition of the LDAP repository 112. The definition of the LDAP repository 112 may be represented as a schema, a table or some other data structure and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain).

In one embodiment, the LDAP server 108 may include an index 114, a filter processing module 118, a filter optimization module 120, an index uniqueness evaluator module 122 and similar modules. In other embodiments, these modules may be implemented as plugins or similarly implemented to provide services to the LDAP server 108.

The LDAP server 108 may maintain an index 114 or set of indices. The index 114 also improves server performance by storing a listing in local memory or storage devices of the entries containing specific attribute values or similar indexed data. The entries in the index 114 may be set by a system administrator, may have default settings or may be similarly maintained.

A filter processing module 118 may receive filters from queries and process the filter to retrieve a set of entries that meet the requirements of the filter. The filter processing module 118 may call a filter optimization module 120 to reorganize the filter to improve the efficiency with which the filter may be processed. The filter optimizaiton module 120 may reorganize the filter to place the most unique search terms in a position to be evaluated first. Evaluating relatively unique search terms first reduces the number of entries that must be evaluated. The uniqueness of each indexd search term may be determineed by the uniqueness evaluator module 122. The uniqueness evaluator module may execute periodically to compile information regarding the number of targets that are present in each index as well as the number of keys in each index or similar information about each index. This ratio of targets to keys in the index may be used as a gage of the uniqueness of an index. Other similar algirthms may be used to generate an indicator of the uniqueness of each index.

Figure 2:
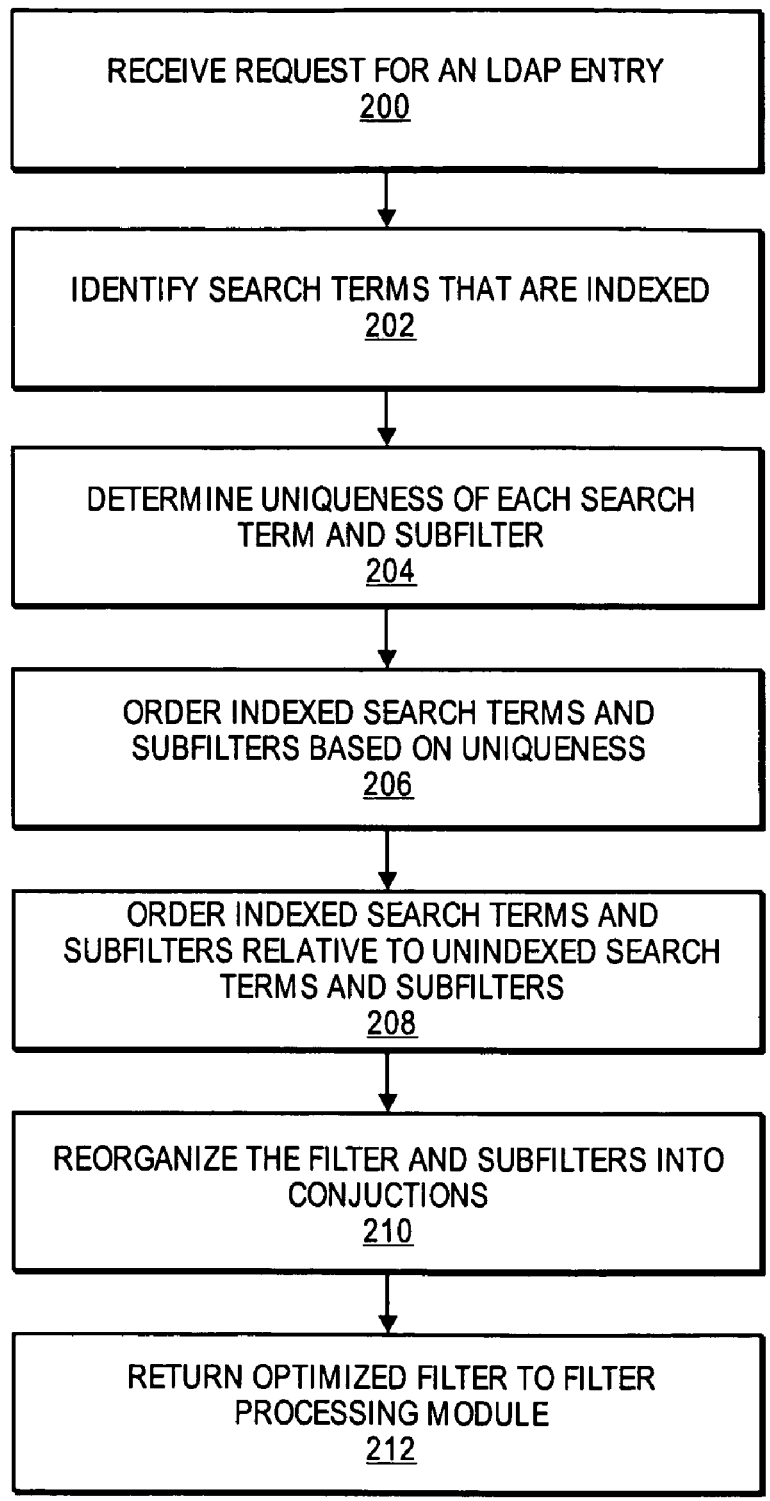
FIG. 2 is a flowchart of one embodiment of a process for optimizing filters for LDAP queries.

FIG. 2 is a flowchart of one embodiment of a method for handling LDAP requests. The method may be performed by processing logic that may comprise hardware (e.g., circuitry, dedicated logic, programmable logic, microcode, etc.), software (such as instructions run on a processing device) or a combination thereof. In one embodiment, the method is performed by the LDAP directory server 108 of FIG. 1.

Referring to FIG. 2, the method begins with processing logic receiving a request pertaining to data in an LDAP repository (block 200). The request may be received from a client, application server or similar entity and may be in the form of a request for a specific entry or attribute that may be retrieved from the LDAP repository and returned to the requesting client. In other cases the request will be in the form of a search or filter. For example, a request may be for the user name of all employees in specific divisions of the company. This request may be represented as a logical expression or filter: (|(division=legal)(division=IT)). The filter may be applied to generate a candidate list of entries that meet the requirements of the search filter (block 202). The candidate list may include a list of entries in the LDAP repository that have attribute values that meet the filter requirements. To find the entries that meet the requirements of the filter, each entry in the LDAP repository must be checked unless an index exists for a search term. An index tracks each of the entries with specific attributes or attribute values.

A received query involving a filter may be checked to determine which search terms in the filter are indexed (block 202). Indexed search terms may be prioritized for evaluation over non-indexed search terms. Each search term is analyzed sequentially. The evaluation of the first search term results in a candidate list. The candidate list is a list of all entries that meet the requirements of the first search term. All subsequent search terms are applied to the candidate list. Each application of a search term to the list may reduce or expand the size of the candidate list. Search terms that are related by a conjunction reduce the size of the list and search terms related by a disjunction increase the size of the list. If the search terms are related by a conjunction, then the size of the candidate list may diminish with each evaluated search term until a minimum number or threshold level of candidate entries in the candidate list remain. Once the threshold level is reached, then the individual search terms are no longer applied to the candidate list. Instead the remaining search terms are applied to each of the remaining entries in the candidate list to obtain a final candidate list. The threshold level may be any number of entries remaining in the candidate list. The threshold level may be a predetermined number of entries or may be determined by any algoritm. For example, a threshold level may be ten entries that remain in the candidate list. If 10 or fewer entries are in the candidate list then the remaining search terms are applied to each of these entries.

This process is most efficient when the most unique indexed search filters are applied first, because this generates the smallest initial candidate list the further processing of which demands fewer resources due to its small size. Each search term and subfilter (i.e., additional search terms and logic that may be a part of a search term or nested within the main filter) may be evaluated to determine its uniqueness to allow the search terms and subfilters to be reordered according to this uniqueness (block 204). Each index may include an indicator of the uniqueness of the search term. The uniqueness may be measured in terms of the number of referenced entries, number of keys or similar indicators of uniqueness. For example, an index may have a uniqueness value that is derived by dividing the number of keys by the number of targets. The higher the resulting value the more unique the search term that corresponds to the index.

The search terms may be reordered based on the determined uniqueness value (block 206). The reordering is based on the order of evaluation. If the search terms are evaluated left to right the most unique search terms may be reordered to the leftmost positions. Any type of reordering scheme may be utilized that corresponds to the evaluation order of the search terms.

The indexed search terms may also be reordered to have priority over the unindexed search terms (block 208). In one embodiment, a uniqueness value may be determined for unindexed search terms. The unique unindexed search terms may be ordered to be evaluated before the less unique unindexed search terms but after the indexed search terms. In another embodiment, the uniqueness evaluation may factor in the indexed or unindexed status of a search term and the ordering of the search terms may be done primarily based on the uniqueness value of each search term where in some instances depending on the weighting a very unique unindexed search term may be prioritized over a non-unique or common indexed search term.

The filter may further be reorganized based on the logical relationships between the search terms using the properties of Boolean logic (block 210). The search filters and the subfilters may be reorganized into conjunctions or similar expressions to facilitate the evaluation of the search filters. Organizing the search filters into logical conjunctions (i.e., the logical expressions are primarily related to one another by logical AND operators) allows for a progressive narrowing of a candidate list that benefits from a sequential evaluation where more unique terms are evaluated before less unique terms.

The optimized search filter may then be returned to the filter processing module to be evaluated (block 212). In other embodiments, the order of the filter optimization process may be altered or some aspects may be done in parallel to further optimize the process.

Figure 3:
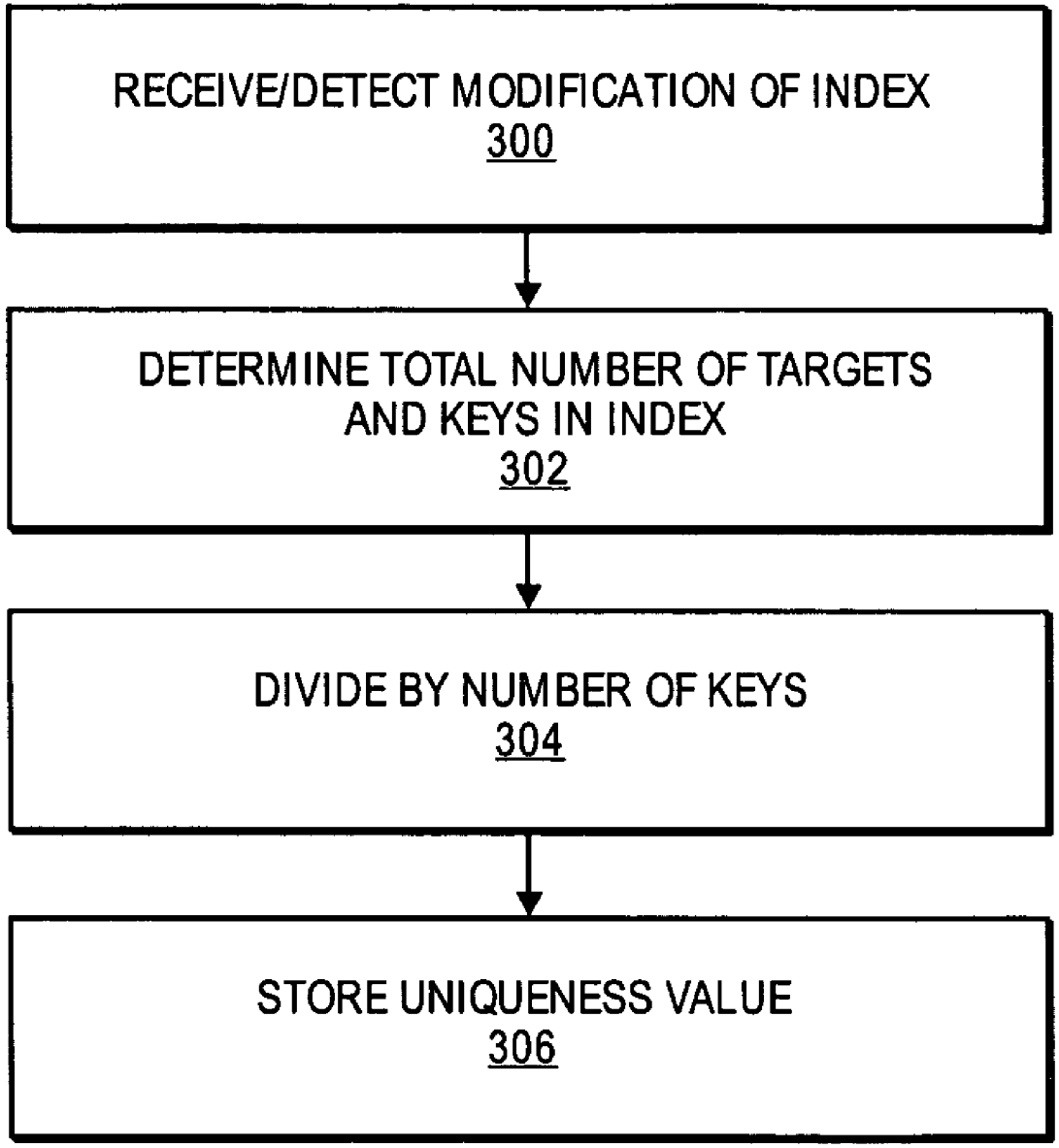
FIG. 3 is a flowchart of one embodiment of a process for determining a uniqueness value for an index.

FIG. 3 is a flowchart of one embodiment of a process for determining a uniqueness value for an index. This process may be executed by an index uniqueness evaluator module or similar module. The process may be executed at system start up or at predetermined intervals to generate or update uniqueness values for each index. In one embodiment, the process may be initiated when a change to an index is detected, including the generation of an index (block 300).

In one embodiment, the process may tally the total number of targets for an index (block 302). The targets may be pointers to entries in the LDAP repository that contain a particular attribute value or similar types of targets. Each target may correspond to a key in the index. The key may be an attribute or an attribute value. The process may also tally the number of keys for the index.

The process may divide the number of targets by the number of keys for a particular index (block 304). This calculates the average number of targets per key or the average number of entries that contain each attribute value. This value may be used as an indicator of the uniqueness level of the index as a whole. The lower the calculated number is the fewer the number of targets per key and therefore the more likely that an evaluation of a search term corresponding to the index will produce a small candidate list. The process may store the uniqueness value in the index, in a separate uniqueness level tracking data structure or in a similar location (block 306). This value can then be retrieved and used during the optimization process by the filter optimization module. In other embodiments, other uniqueness indicator algorithms and schemes may be utilized to determine an indicator of the likelihood that a small candidate list may be generated by use of the index.

Figure 4:
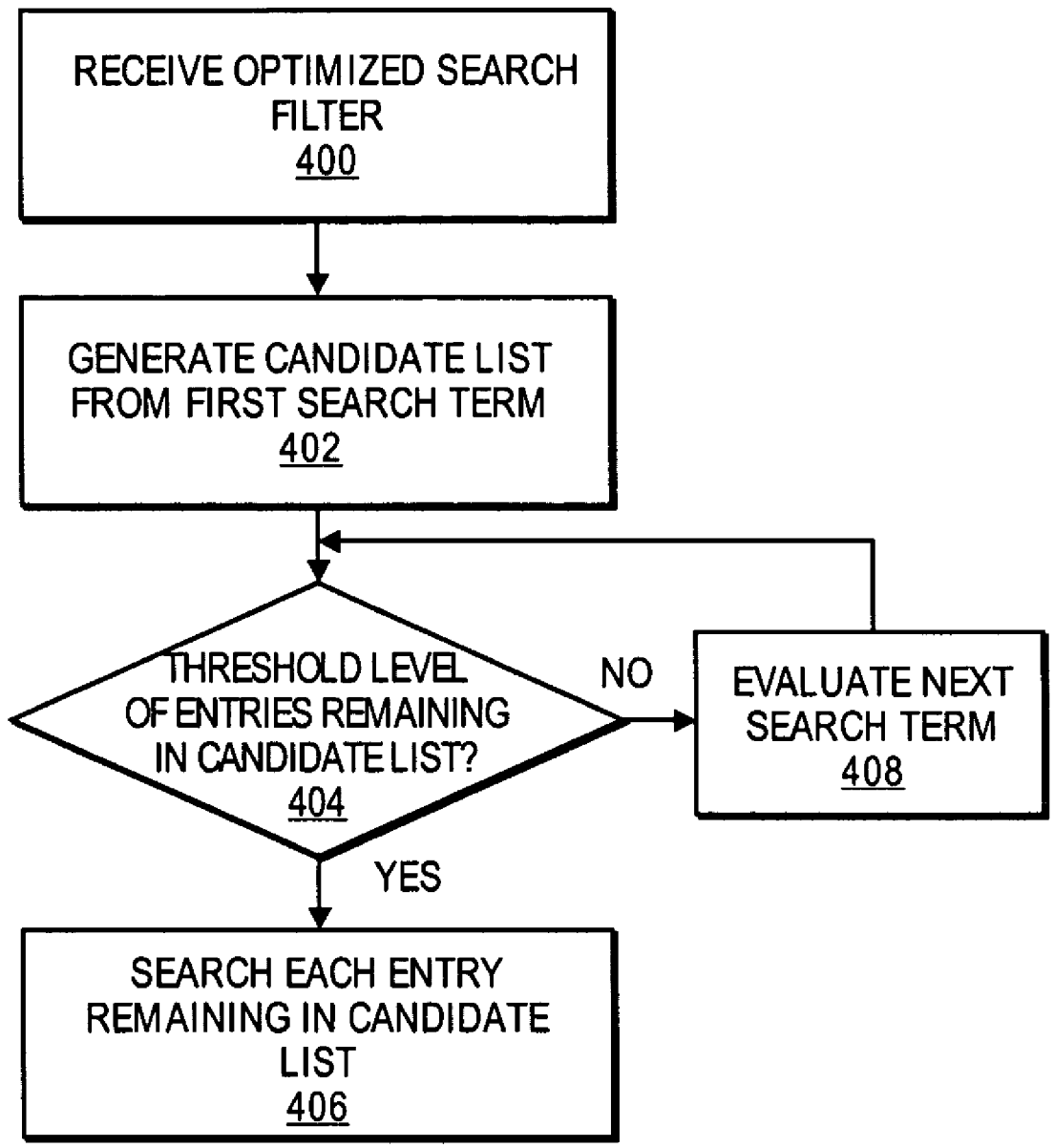
FIG. 4 is a flowchart of one embodiment of a process for processing the LDAP query.

FIG. 4 is a flowchart of one embodiment of a process for processing an LDAP query. In one embodiment, the process may be initiated when a query is received from a client or application server (block 400). This process may be executed by the filter processing module or similar module of the LDAP directory server.

The process may begin with the evaluation of the first term in the optimized search to generate an initial candidate list (block 402). The resulting candidate list may be evaluated to determine if a threshold number of entries has been reached in the candidate list (block 404). The threshold level may represent a number of entries that remain in the candidate list during the process of evaluating a search filter. Specifically, the threshold level may represent the number of entries in the candidate list that can be more efficiently evaluated by applying the remainder of the search filter to each entry, instead of applying the search terms to the candidate list in sequence (block 406). If the threshold level has not been reached then the next search term may be evaluated by application to the current candidate list (block 408). Only the entries in the candidate list are evaluated to determine if they meet the requirements of the next search term. This assumes that the canonicalization of the filter produces a set of search terms or subfilters that are related to one another by a logical AND operation as a conjunction, as discussed above. This process may continue until the search terms and subfilters have been exhausted or until the threshold level is reached. The process may evaluate subfilters by evaluating the search terms of each subfilter to generate candidate lists. In one embodiment, the process of evaluating the search terms and subfilters may be a recursive process or similar process.

Figure 5:
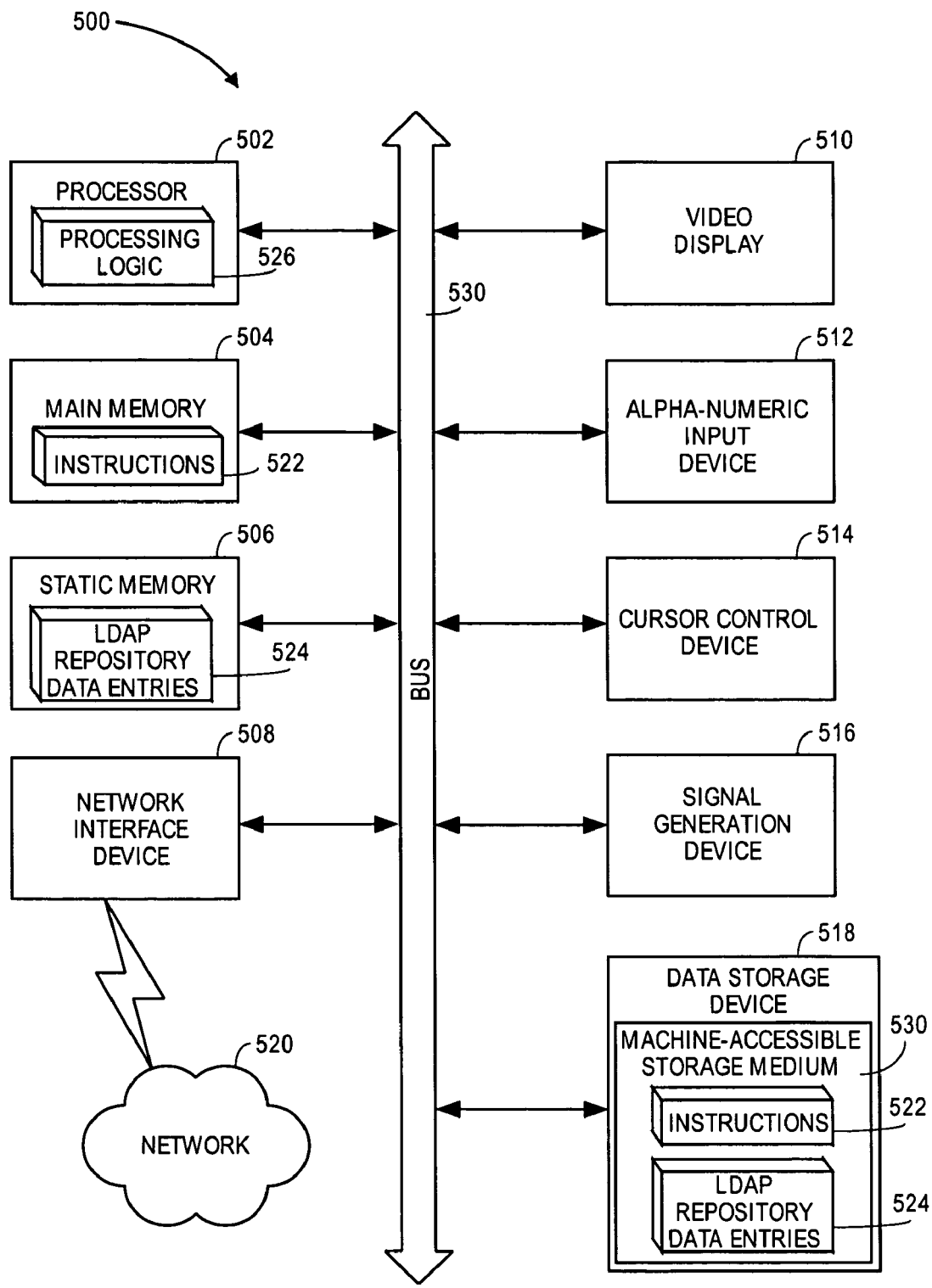
FIG. 5 is a diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server or a client machine in client-server network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 may represent one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 600, the main memory 504 and the processing device 502 also constituting machine-accessible storage media. The software 522 may further be transmitted or received over a network 520 via the network interface device 508.

The machine-accessible storage medium 530 may also be used to store LDAP repository data entries 524. LDAP repository data entries 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Thus, a method and apparatus for optimizing LDAP indices has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, at a lightweight directory access protocol (LDAP) server, a query to retrieve data from a LDAP repository communicably coupled to the LDAP server;
reorganizing, by the LDAP server, search terms in the query based on a uniqueness value of corresponding LDAP indexes to generate a modified query, wherein the uniqueness value of each LDAP index is based on a ratio of targets to keys in the corresponding LDAP index;
executing, by the LDAP server, the modified query;
generating a candidate list of entries based on the search terms; and
detecting a threshold number of entries in the candidate list.

2. The method of claim 1, further comprising:
identifying search terms having a corresponding LDAP index.

3. The method of claim 1, further comprising:
ordering indexed search terms to be evaluated before unindexed search terms.

4. The method of claim 1, further comprising:
ordering search terms to be evaluated based on search term uniqueness.

5. The method of claim 1, further comprising:
searching each entry in the candidate list if the threshold number is detected.

6. The method of claim 1, further comprising:
counting a number of targets in an index; and
dividing the number of targets by a number of keys in the index to generate a uniqueness value for the index.

7. The method of claim 1, further comprising:
analyzing an index to determine a uniqueness value if a modification of the index is detected.

8. The method of claim 6, further comprising:
storing the uniqueness value in the index.

9. An article of manufacture, comprising a computer-readable storage medium including data that, when accessed by a computer, cause the computer to perform a method comprising:
receiving a query for a lightweight directory access protocol (LDAP) repository;
reorganizing search terms in the query based on a uniqueness value of corresponding LDAP indexes to generate a modified query, wherein the uniqueness value of each LDAP index is based on a ratio of targets to keys in the corresponding LDAP index;
executing the modified query;
generating a candidate list of entries based on the search terms; and
detecting a threshold number of entries in the candidate list.

10. The article of manufacture of claim 9, further comprising:
identifying search terms having a corresponding LDAP index.

11. The article of manufacture of claim 9, further comprising:
ordering indexed search terms to be evaluated before unindexed search terms.

12. The article of manufacture of claim 9, further comprising:
ordering search terms to be evaluated based on search term uniqueness.

13. The article of manufacture of claim 9, further comprising:
searching each entry in the candidate list if the threshold number is detected.

14. The article of manufacture of claim 9, further comprising:
counting a number of targets in an index; and
dividing the number of targets by a number of keys in the index to generate a uniqueness value for the index.

15. The article of manufacture of claim 9, further comprising:
analyzing an index to determine a uniqueness value if a modification of the index is detected.

* * * * *